(12) United States Patent
Stallmann

(10) Patent No.: US 8,118,060 B2
(45) Date of Patent: Feb. 21, 2012

(54) VALVE PART OF A HYDRAULIC CONTROL VALVE FOR CONTROLLING FLOWS OF PRESSURIZED MEDIUM

(75) Inventor: John Stallmann, Washington, MI (US)

(73) Assignee: Schaeffer Technologies GmbH & Co. KG, Herzogenaurach (GB)

( * ) Notice: Subject to any disclaimer, the term of this patent is extended or adjusted under 35 U.S.C. 154(b) by 886 days.

(21) Appl. No.: 12/175,640

(22) Filed: Jul. 18, 2008

(65) Prior Publication Data
US 2009/0020718 A1   Jan. 22, 2009

Related U.S. Application Data

(60) Provisional application No. 60/950,487, filed on Jul. 18, 2007.

(51) Int. Cl.
*F16K 11/085* (2006.01)
(52) U.S. Cl. .................................. 137/625.68
(58) Field of Classification Search .............. 137/625.2, 137/625.27, 625.68, 625.69
See application file for complete search history.

(56) References Cited

U.S. PATENT DOCUMENTS

| | | | | |
|---|---|---|---|---|
| 2,964,023 A * | 12/1960 | Meulendyk | ........... | 137/625.12 |
| 4,126,155 A * | 11/1978 | Bertram | .................. | 137/625.69 |
| 4,155,535 A * | 5/1979 | Seamone | .................... | 251/282 |
| 4,457,341 A * | 7/1984 | Aspinwall | ............... | 137/625.48 |
| 5,878,782 A * | 3/1999 | Nakajima | ............... | 137/625.65 |
| 6,860,291 B2 * | 3/2005 | Rub | .............................. | 137/596 |

FOREIGN PATENT DOCUMENTS

| | | |
|---|---|---|
| DE | 10239207 | 3/2004 |
| EP | 1596041 | 11/2005 |

* cited by examiner

*Primary Examiner* — John Fox
(74) *Attorney, Agent, or Firm* — Volpe and Koenig, P.C.

(57) ABSTRACT

A valve part of a hydraulic control valve for controlling flows of pressurized medium is provided, wherein the valve part includes a cylindrical valve housing with a first cylinder casing section extending in the axial direction and a first cylinder base section extending perpendicular to the axial direction, with the sections defining a valve housing hollow space that is open on one side. The first cylinder casing section is provided with a first work connection, a second work connection, and a pressure connection, each of which open into the valve housing hollow space. A cylindrical control piston is held in the valve housing hollow space so that it can move in the axial direction, and has a second cylinder casing section extending in the axial direction and a second cylinder base section extending perpendicular to the axial direction, with these sections defining a control piston hollow space that is open on one side. The second cylinder casing section adjacent to the second cylinder base section is provided with a radial discharge connection opening into the control piston hollow space, and the control piston is constructed such that the work connections can be connected selectively in a fluid conducting manner to the pressure connection and to the discharge connection through axial displacement of the control piston. The valve part is distinguished in that the discharge connection of the control piston includes at least one inclined opening, having a wall direction that assumes an angle of less than 90° to the axial direction.

18 Claims, 4 Drawing Sheets

VALVE PART OF A HYDRAULIC CONTROL VALVE FOR CONTROLLING FLOWS OF PRESSURIZED MEDIUM

CROSS-REFERENCE TO RELATED APPLICATIONS

This application claims the benefit of U.S. Provisional Application 60/950,487, filed Jul. 18, 2007, which is incorporated herein by reference as if fully set forth.

BACKGROUND

The invention relates to the technical field of control valves and relates, according to its class, to a valve part of a control valve activated by an actuator for controlling flows of pressurized medium.

In internal combustion engines, gas-exchange valves are activated by the cams of a camshaft set in rotation by the crankshaft, wherein, through the arrangement and shape of the cams, the control times of the gas-exchange valves can be set in a selective way. From the background of thermodynamic processes, it has proven advantageous if, during the operation of the internal combustion engine, the control times of the gas-exchange valves are influenced as a function of the current operating state of the engine, such as rotational speed or load. This influence is set by the relative rotational position between the cam and crankshaft. The use of devices for changing and fixing the relative rotational position between the camshaft and crankshaft, generally designated as "camshaft adjusters," has been known for a long time.

Camshaft adjusters typically comprise a drive part locked in rotation with the crankshaft via a drive wheel and a driven part fixed to the camshaft, as well as a hydraulic control drive, which is connected between the drive part and driven part and which transmits the torque from the drive part to the driven part and allows a fixing and also adjustment of the relative rotational position between the drive part and driven part.

Hydraulic camshaft adjusters are typically constructed as axial piston adjusters or rotary piston adjusters. For an axial piston adjuster, the drive part engages with a piston via helical gearing. This piston engages, on its side, with the driven part by helical gearing. Between the drive part and driven part, a pressure space is formed, which is divided by the piston into two pressure chambers. For a rotary piston adjuster, the drive part constructed in the form of an external rotor ("stator") and the driven part constructed in the form of an internal rotor ("rotor") are arranged concentrically and adjustable in rotation relative to each other. Pressure spaces are formed in the radial intermediate space between the stator and rotor. A vane connected to the rotor extends into each of these pressure spaces, such that each pressure space is divided into two pressure chambers. Through selective pressurization of the pressure chambers of each pressure space, that is, by generating a pressure difference across the pressure chamber pair of each pressure space, the drive part can be moved relative to the driven part, so that a rotation of the camshaft and consequently a change in the relative rotational position between the camshaft and crankshaft is created. On the other hand, the relative rotational position can be maintained through a corresponding equal pressurization of the two pressure chambers of a pressure space.

Controlling the hydraulic camshaft adjuster is realized by a control unit, which controls the feed and discharge of pressurized medium to and from the individual pressure chambers based on detected characteristics of the internal combustion engine. The flows of pressurized medium are regulated by a control valve (proportional valve) controlled by the control unit.

Control valves for controlling the flows of pressurized medium for camshaft adjusters have been known as such for a long time and are described, for example, in the European Patent Application EP 1 596 041 A1 and the German Offenlegungsschrift [unexamined patent application] DE 102 39 207 A1 of the applicant. They comprise, as essential components, an actuator, typically an electromagnet with a hollow cylindrical magnetic housing, in whose hollow space a coil winding and an axially moving magnetic armature are arranged with a tappet, as well as a hydraulic valve part with a hollow cylindrical valve housing, in whose hollow space a control piston that can move in the axial direction is held. When the magnetic armature is energized, the tappet acts on the control piston of the valve part, so that the piston can be displaced in the axial direction against the compressive force of a compression spring, in order to regulate the flows of pressurized medium in this manner.

In a typical construction, the valve housing is provided on its outer periphery with a plurality of annular grooves that are spaced apart in the axial direction and in which radial boreholes are machined. These boreholes open into the hollow space of the valve housing and are used as a pressure connection and work connections. The control piston can be provided in the form of a hollow piston with a hollow space, which is open on one side and whose opening is used as a discharge connection. If the hollow space opening of the control piston is located on the end away from the tappet, then it can be formed as an axial opening. If the hollow space opening of the control piston is located on the end facing the tappet, then it is necessary to form this opening as a radial opening, in order to provide a sufficient contact surface on the control piston for the tappet. An example construction of such a valve part is shown in FIG. 4.

Accordingly, the valve part designated as a whole with the reference number 100 of an electromagnetic control valve comprises a hollow cylindrical valve housing 101, which surrounds a valve housing hollow space 103 with an axial hollow space opening 121. In the valve housing hollow space 103, a control piston 102 is held so that it can move in the axial direction. A tappet 104, which is only shown partially and which is attached rigidly to a magnetic armature of an electromagnet not shown in FIG. 4, contacts the end face 105 of the control piston 102 at the left in FIG. 4. When the magnetic armature is energized, the tappet is displaced in the axial direction relative to the valve part 100 and in this way displaces the control piston 102 against the spring force of a compression spring 106. On one end, the compression spring 106 contacts the end of the control piston 102 away from the tappet and for this purpose is held in an axial first ring step 107. On its other end, the compression spring 106 is supported on a base surface 109 oriented perpendicular to the axial direction of an axial second ring step 108 of the valve housing hollow space 103.

The valve housing 101 is provided on its outer periphery with three ring grooves, namely a first ring groove 124, a second ring groove 125, and a third ring groove 126, spaced apart in the axial direction. In the ring grooves, first radial boreholes 110, second radial boreholes 111, and third radial boreholes 112 are machined uniformly about the periphery, which each open into the valve housing hollow space 103. In the shown axial section, the ring grooves transition directly into the radial boreholes, so that they are not distinguished from the ring grooves in the drawing. As indicated by the arrows, the first ring groove 124 with the first radial boreholes 110 acts as a first work connection A, the second ring groove 125 with the second radial boreholes 111 acts as a pressure connection P, and the third ring groove 126 with the third radial boreholes 112 as a second work connection B.

The control piston 102 is constructed in the form of a hollow piston, wherein the control piston hollow space 118 is formed by a blind borehole open toward the end face 109 of the valve housing. In the outer periphery of the control piston 102, three ring grooves are machined, namely a fourth ring groove 114, a fifth ring groove 115, and a sixth ring groove 113 located between the fourth and fifth ring groove. The fourth ring groove 114 is provided with fourth radial boreholes 116 distributed uniformly about the periphery and the fifth ring groove 115 is provided with fifth radial boreholes 117, which are distributed uniformly about the periphery and which each open into the control piston hollow space 118. Furthermore, the control piston 102 is provided on its tappet-side end section with sixth radial boreholes 119, which are arranged distributed about the periphery and which connect the control piston hollow space 118 with a twice offset, axial third ring step 120 in a fluid-conducting way, which opens into the hollow space opening 121 of the valve housing 101. The hollow space opening 121 is used as a discharge connection T. Adjacent to the sixth ring groove 113 are a first ring bar 122 and a second ring bar 123, whose peripheral surfaces are shaped so that for an axial displacement of the control piston 102, the first and the third radial boreholes 110, 112 can be covered and opened, in order to regulate the flow rate of pressurized medium in this way by changing the cross sections of the openings.

Thus, according to the axial position of the control piston 102, the first work connection A and the second work connection B can be connected in a fluid-conducting way selectively with the pressure connection P or the tank connection T. In FIG. 4, a situation is shown, in which the first work connection A is connected to the tank connection T, while the second work connection B is connected to the pressure connection P. If pressurized medium flow into the control piston hollow space 118 (as specified by the dashed arrows), the flows of pressurized medium directed inward in the radial direction are deflected into an axial flow of pressurized medium, which is directed toward the tappet-side end of the control piston hollow space 118 and which flows essentially in the middle of the control piston hollow space 118. Then the axial flow of pressurized medium is deflected into flows of pressurized medium directed outwardly in the radial direction, which are diverted into the discharge connection T. In this way, inevitably a build-up pressure is generated by the deflection of the axial flow of pressurized medium on the end face of the control piston hollow space 118, which applies a load on the control piston 102 in a direction, which is equal to the direction of the spring force of the compression spring (to the left in FIG. 4). In addition, an eddy flow is generated by the deflection of the axial flow of pressurized medium. Consequently, these effects lead to an imbalance in the pressure forces primarily in the middle of the control piston 102, with these forces generating the undesired force curves for the desired axial displacements of the control piston 102. In addition, the tappet 104 activated by the electromagnet must shift the control piston 102 against a higher resistance, so that the electromagnet must have a sufficiently robust construction, in order to withstand an increased heat generation for the higher current intensities necessary for this purpose.

SUMMARY

Accordingly, the object of the invention is making available a valve part of an electromagnetic control valve for regulating flows of pressurized medium, through which the disadvantages named above and occurring with a deflection of the axial flow of pressurized medium can be avoided.

This and other problems will be solved according to the invention by a valve part of a control valve for controlling flows of pressurized medium, in particular, for a hydraulic camshaft adjuster of an internal combustion engine, with the features of the invention. Advantageous constructions of the invention are specified below.

According to the invention, a valve part of a control valve (hydraulic valve) is shown for controlling flows of pressurized medium, wherein this valve is used, in particular, for controlling flows of pressurized medium of a hydraulic camshaft adjuster.

The valve part comprises a (hollow) cylindrical valve housing with a first cylinder casing section extending in the axial direction (relative to the valve longitudinal direction or cylinder axis). The first cylinder casing section comprises a valve housing hollow space. In addition, the valve housing can comprise a first cylinder base section extending perpendicular to the axial direction. In this embodiment, the first cylinder casing section and the first cylinder base section together define a valve housing hollow space that is open on one side. The first cylinder casing section is provided with a first (radial) work connection (A), which can be constructed, for example, in the form of a ring groove with machined radial openings, which open into the valve housing hollow space. The first work connection (A) is provided, for example, for connecting to one of the two pressure chambers of a pressure space of a hydraulic camshaft adjuster. The first cylinder casing section is further provided with a (radial) second work connection (B), which can be constructed, for example, in the form of a ring groove with machined radial openings, which open into the valve housing hollow space. The second work connection (B) is provided, for example, for connecting to the second of the two pressure chambers of a pressure space of a hydraulic camshaft adjuster. In addition, the first cylinder casing section is provided with a (radial) pressure connection (P), which can be constructed, for example, in the form of a ring groove with machined radial openings, which open into the valve housing hollow space. The pressure connection (P) is provided, for example, for connecting to a pressurized medium pump. The first work connection (A), the second work connection (B), and the pressure connection (P) each open into the valve housing hollow space.

The valve part further comprises a cylindrical control piston held in the valve housing hollow space so that it can move in the axial direction with a second cylinder casing section extending in the axial direction and a second cylinder base section extending perpendicular to the axial direction. The second cylinder casing section and the second cylinder base section together bound a control piston hollow space. This space can be, for example, open on one side, but also, apart from the connections, can have a closed construction. The second cylinder casing section is provided, adjacent to the second cylinder base section, with a discharge connection (T) opening into the control piston hollow space for connecting to a pressurized medium tank.

The control piston is constructed with corresponding control sections in such a way that the two work connections (A, B) can be connected in a fluid conducting way through axial displacement of the control piston selectively with the pressure connection (P) and the discharge connection (T). Thus, the first work connection A can be connected to the pressure connection P in a fluid conducting way, while the second work connection B is connected to the discharge connection T in a fluid conducting way. Likewise, the second work connection B can be connected to the pressure connection P in a fluid conducting way. In this way, one of the two pressure chambers of a pressure space of a camshaft adjuster can be connected to a pressurized medium pump via a work connection, while the other pressure chamber of the pressure space is connected via the other work connection to the discharge connection and attached pressurized medium tank, so that the drive part and driven part can be rotated hydraulically. At the same time, the control piston can hydraulically close the two work connections A, B, so that a relative rotational position can be set between the drive part and driven part.

The valve part according to the invention is distinguished essentially in that the discharge connection (T) provided in the second cylinder casing section of the control piston comprises at least one inclined opening (with, for example, a round or rectangular opening cross section) that opens into the control piston hollow space and whose wall direction assumes an angle of less than 90° (and greater than 0°) to the axial direction (relative to an axial direction, which is directed toward the second cylinder base section). Advantageously, the wall direction of the inclined opening assumes an angle in the range from 20° to 60°, for example, 30°, to the axial direction.

If pressurized medium flow in the axial direction toward the second cylinder base section of the control piston, in this way it can be advantageously achieved that a build-up pressure of the flow of pressurized medium decreases and an eddy formation is reduced.

For an especially advantageous configuration of the valve part according to the invention, the second cylinder base section of the control piston is provided with a flow guiding structure (for example, in the form of a cone or wedge), which projects into the control piston hollow space and which has at least one flow guiding surface that deflects an incoming axial flow of pressurized medium in the direction toward at least one inclined opening of the radial discharge connection (T). In this way, it is especially advantageous when the one or more flow guiding surfaces transitions into the one or more inclined openings of the discharge connection (T) of the control piston, wherein, in particular, the one or more flow guiding surfaces and the one or more inclined openings are directed at the same angle relative to the axial direction.

If pressurized medium flow in the axial direction toward the second cylinder base section of the control piston, then in this way it can be advantageously achieved that a build-up pressure of the flow of pressurized medium decreases even more and an eddy formation is reduced even more strongly.

For another especially advantageous configuration of the valve part according to the invention, the control piston hollow space is shaped at least partially in the form of a nozzle directed toward the second cylinder base section of the control piston. The nozzle here has advantageously a frustum-like shape tapering toward the second cylinder base section of the control piston. The nozzle is advantageously shaped in such a way that a nozzle structure projecting into the control piston hollow space is formed on an inner peripheral surface of the second cylinder casing section of the control piston.

The invention further extends to a control valve for controlling the pressurized medium, in particular, for a hydraulic camshaft adjuster of an internal combustion engine, which comprises a valve part as described above and an actuator, in particular, in the form of an electromagnet. The actuator comprises a control element, for example, in the form of a tappet, which is in active connection with the control piston of the valve part in such a way that the control piston can be displaced in the axial direction against the spring force of a compression spring.

The invention further extends to a hydraulic camshaft adjuster with a control valve described as above.

BRIEF DESCRIPTION OF THE DRAWINGS

The invention will now be explained in more detail with reference to embodiments, wherein reference is made to the enclosed drawings. Elements that are identical or that have identical functions are designated in the drawings with identical reference symbols. Shown are.

DETAILED DESCRIPTION OF THE PREFERRED EMBODIMENTS

Figure 4:
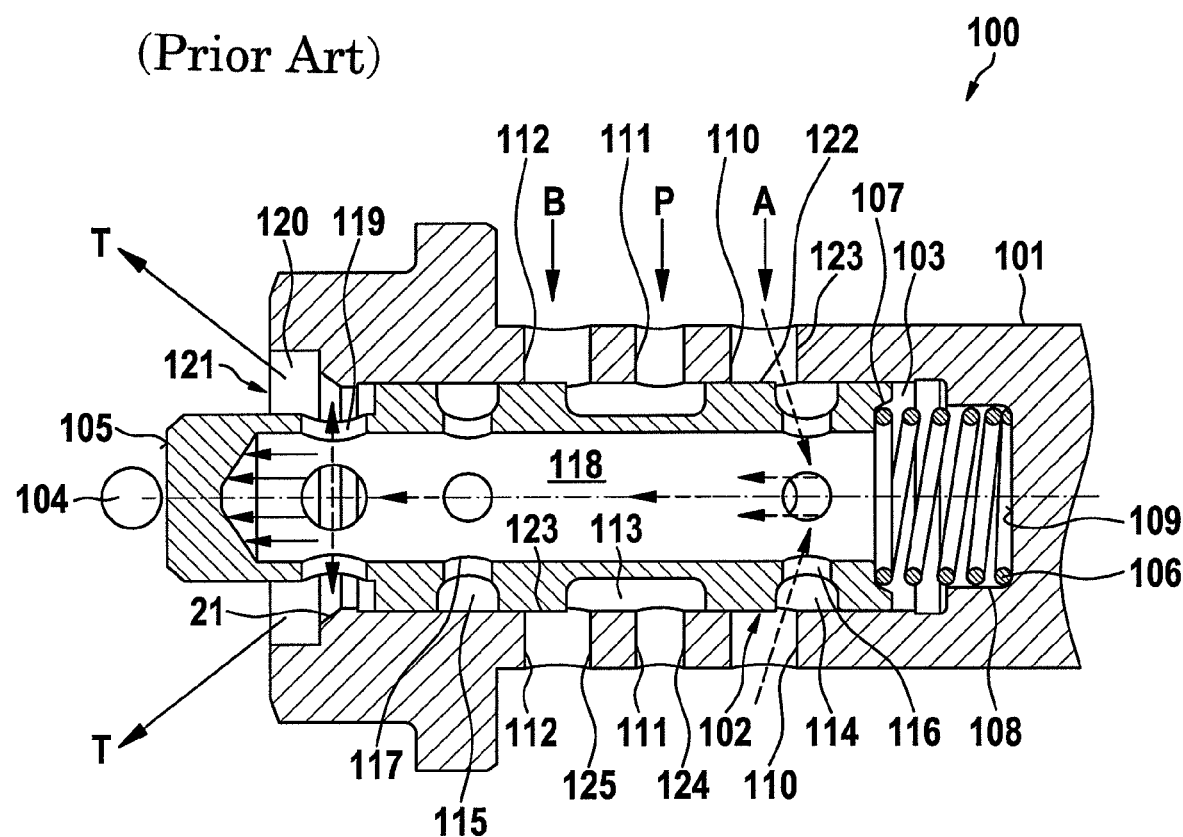
FIG. 4 is an axial section view of a valve part according to the class known in the state of the art of an electromagnetic control valve.

FIG. 4 shows a conventional valve part according to the class of an electromagnetic control valve, and is already explained in detail in the introduction of the description, so the description is not repeated here.

Figure 1:
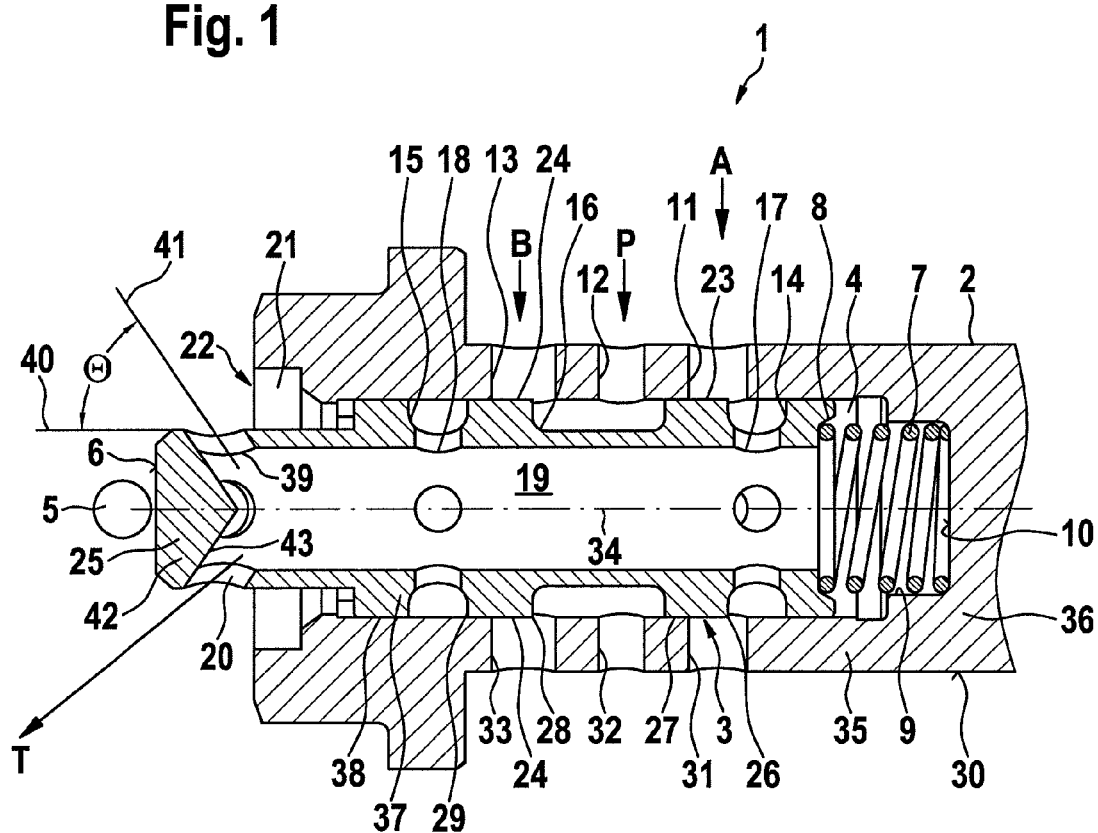
FIG. 1 is an axial section view of a valve part according to a first embodiment of the valve part according to the invention.
Figure 2A:
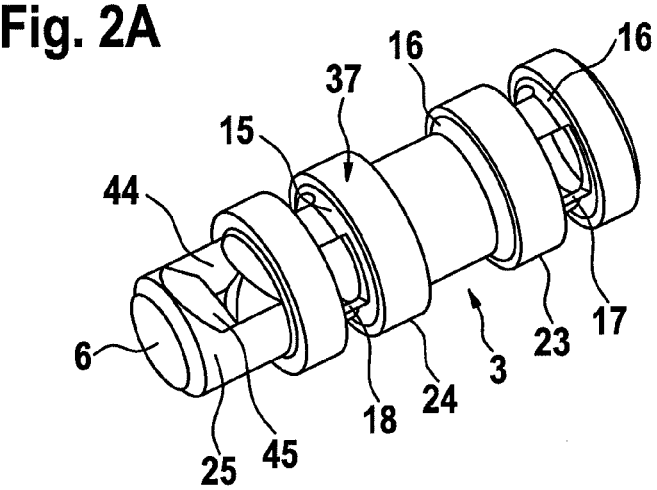
FIGS. 2A-2D are a perspective view as well as several section views of a control piston corresponding to a second embodiment of the valve part according to the invention.
Figure 2B:
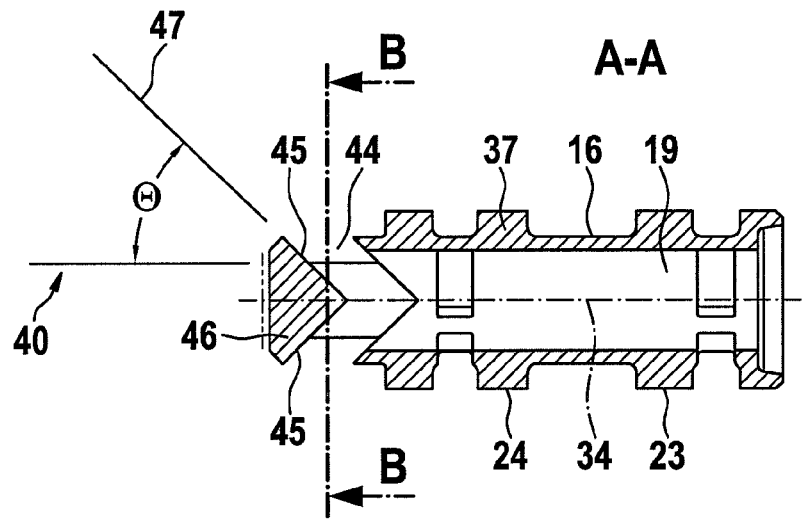
Figure 2C:
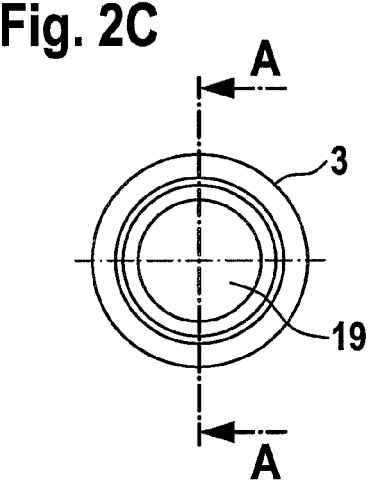
Figure 2D:
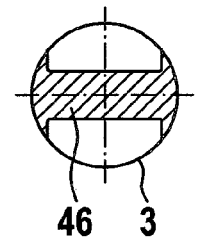
Figure 3:
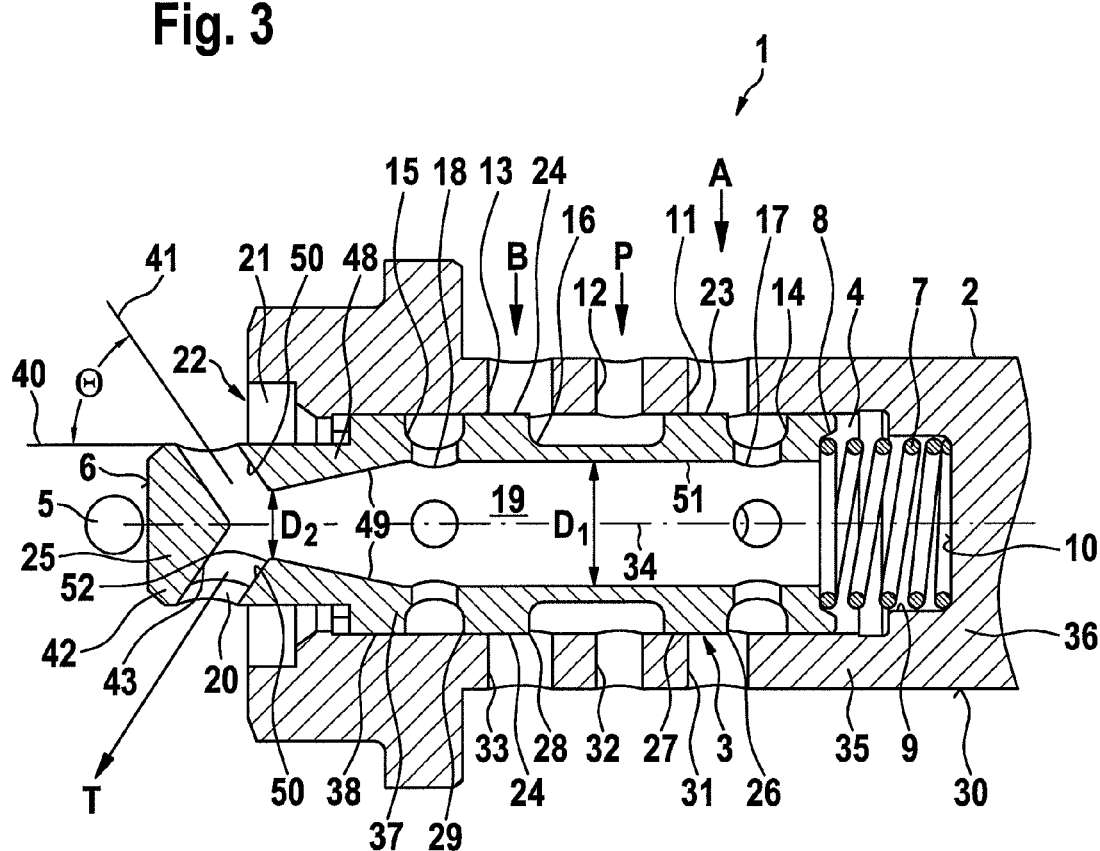
FIG. 3 is an axial section view of a valve part corresponding to a third embodiment of the valve part according to the invention.

In FIGS. 1 to 3, embodiments for the valve part according to the invention of an electromagnetic control valve for a camshaft adjuster of an internal combustion engine are shown.

In FIG. 1, a first embodiment of the valve part according to the invention is shown in axial section. The valve part 1 of an electromagnetic control valve designated overall with the reference number 1, in particular, for regulating the pressurized medium of a hydraulic camshaft adjuster of an internal combustion engine, comprises an essentially hollow cylindrical valve housing 2 with a first cylinder casing section 35 arranged in the axial direction (parallel to a cylinder axis 34) and a first cylinder base section 36 extending perpendicular to the cylinder axis 34 as an end section. The first cylinder casing section 35 and the first cylinder base section 36 define a valve housing hollow space 4 open on one side with an axial hollow space opening 22.

Coaxial to the cylinder axis 34, in the valve housing hollow space 4, an essentially hollow cylindrical control piston 3 is held so that it can move in the axial direction. The control piston 3 constructed in the form of a hollow piston comprises a second cylinder casing section 37 arranged in the axial direction (parallel to a cylinder axis 34) and a second cylinder base section 25, which extends perpendicular to the cylinder axis 34, as an end section. The second cylinder casing section 37 and the second cylinder base section 25 define a control piston hollow space 19 that is open on one side with an axial hollow space opening not shown in more detail in FIG. 1 on the side of the first cylinder base section 36 of the valve housing 2.

A tappet 5, which is shown only partially and which is rigidly attached to a magnetic armature of an electromagnet (electromagnetic actuator) not shown in FIG. 1, contacts the end face 6 at the left in FIG. 1 of the second cylinder base section 25 of the control piston 3. When the magnetic armature is energized, the tappet 5 is displaced in the axial direction relative to the valve part 1 and here displaces the control piston 3 in the axial direction against the spring force of a compression spring 7. For this purpose, on one end the compression spring 7 contacts the end of the control piston 3 away from the tappet and is held in an axial first ring step 8 of the control piston 3 expanding in the radial direction. On its other end, the compression spring 7 is held in an axial, second ring step 9 of the valve housing hollow space 4 and is supported on a base surface 10 of the first cylinder base section 36 of the valve housing 2 oriented perpendicular to the axial direction 40. The compression spring 7 is here constructed as a helical spring, but can also be any other suitable spring type. If the magnetic armature is not energized, so that the tappet 5 is not activated by the electromagnet, then the compression spring 7 restores the control piston 3 (to the left in FIG. 1).

In the first outer casing surface 30 of the first cylinder casing section 35 of the valve housing 2, three peripheral ring grooves spaced apart from each other in the axial direction are machined, namely a first ring groove 31, a second ring groove 32, and a third ring groove 33. In the first ring groove 31, distributed uniformly around the periphery, first radial boreholes 11 are machined. Likewise, in the second ring groove 32, distributed uniformly around the periphery, second radial boreholes 12 are machined and, in the third ring groove 33, distributed uniformly around the periphery, third radial boreholes 13 are machined. The first, second, and third radial boreholes each open into the valve housing hollow space 4. In the axial section shown in FIG. 1, the ring grooves each transition directly into the radial boreholes, so that no difference can be seen in the drawing between the ring grooves and radial boreholes.

As indicated by the arrows, the first ring groove 31 with the first radial boreholes 11 is used as a first work connection A, the second ring groove 32 with the second radial boreholes 12 is used as the pressure connection P, and the third ring groove 33 with the third radial boreholes 13 is used as the second work connection B.

In the second outer casing surface 38 of the second cylinder casing section 37 of the control piston 3, three peripheral ring grooves spaced apart from each other in the axial direction are machined, namely a fourth ring groove 14, a fifth ring groove 15, and a sixth ring groove 16 located between the fourth and the fifth ring groove. In the fourth ring groove 14, distributed uniformly around the periphery, fourth radial boreholes 17 are machined, which each open into the control piston hollow space 19. The sixth ring groove 16 is used, according to the position of the control piston 3, as a pressurized medium channel for connecting the first radial boreholes 11 to the second radial boreholes 12 or the third radial boreholes 13 to the second radial boreholes 12.

In the second cylinder casing section 37 of the control piston 3, round inclined openings 20 (inclined boreholes) are formed, which open into the control piston hollow space 19 on the tappet side of the fifth ring groove 15 bordering the second cylinder base section 25 of the control piston 3. Through the inclined openings 20, the control piston hollow space 19 is opened at the outer side of the control piston 3, wherein the inclined openings 20 are used, for example, as the discharge connection T.

In the connection assignment shown in FIG. 1, through use of the fourth, fifth, and sixth ring groove 14-16, as well as the fourth radial boreholes 17 machined into the fourth ring groove 14 and the fifth radial boreholes 18 machined into the fifth ring groove 15, according to the axial position of the control piston 3, the first work connection A and the second work connection B are selectively connected or separated in a fluid conducting way to the pressure connection P or to the tank connection T. In FIG. 1, a position of the control piston 3 is shown, in which the first work connection A is connected in a fluid conducting way to the tank connection T and the second work connection B is connected in a fluid conducting way to the pressure connection P. If the control piston 3 is displaced by the effect of the tappet 5 even farther in the axial direction against the spring force of the compression spring 7 (to the right in FIG. 1), the second work connection B can be connected in a fluid conducting way to the tank connection T and the first work connection A to the pressure connection P. At the same time, the control piston 3 can be brought into an intermediate position, in which neither of the two work connections A, B are connected in a fluid conducting way to the pressure connection P or to the tank connection T.

Adjacent to the sixth ring groove 16, a first ring bar 23 and a second ring bar 24 are formed, which are used, in particular, for the axial guidance of the control piston 3 within the valve housing 2. The peripheral surfaces of the two ring bars 23, 24 are shaped so that they can cover or open the first radial boreholes 11 or the third radial boreholes 13 in a sealing way when the control piston 3 is shifted in the axial direction, in order to regulate in this way the flow rate of pressurized medium (for example, oil) by a change in the cross sections of the openings. Adjusting the cross sections of the openings of the first radial boreholes 11 or the third radial boreholes 13 is realized by control edges of the two ring bars 23, 24, namely a first control edge 26 away from the tappet and a second control edge 27 of the first ring bar 23 facing the tappet or a third control edge 28 away from the tappet and a fourth control edge 29 of the second ring bar 24 facing the tappet.

The round inclined openings 20 in the second cylinder casing section 37 of the control piston 3 extend at an angle to the axial direction 40 of the control piston 3 provided by the cylinder axis 34. Expressed more precisely, the wall direction 41 of the inclined opening walls 39 forming the inclined openings 20 is at an angle to the axial direction 40, wherein the wall direction 41 assumes an angle θ to the axial direction 40, which is greater than 0° and less than 90°. In the embodiment of FIG. 1, the angle θ is specified with respect to an axial direction 40 directed toward the tappet 5 or toward the second cylinder base section 25 of the control piston 3. The angle θ advantageously lies within an angle range between 20° and 60° and equals, in the embodiment, ca. 30°.

Furthermore, in the embodiment of FIG. 1, the second cylinder base section 25 of the control piston 3 has a conical shape, wherein a cone 42 projects toward the side of the control piston 3 away from the tappet into the control piston hollow space 19. The cone 42 is bounded by a conical surface 43, which transitions flush in the axial section and in a straight line into the inclined openings 20, wherein the conical surface 43 and the wall direction 41 of the inclined openings 20 in the axial section assume an equal angle to the axial direction 40.

In the position of the control piston 3 shown in FIG. 1, in which the first work connection A is connected in a fluid conducting way to the tank connection T, pressurized medium can flow via the first radial boreholes 11 and the fourth radial boreholes 17 into the control piston hollow space 19. The flows of pressurized medium directed inward in the radial direction are deflected into an axial flow of pressurized medium, which is directed toward the second cylinder base section 25 and which flows essentially in the center of the control piston hollow space 19.

The axial flow of pressurized medium strikes the conical surface 43 of the of the cone 42 and is deflected from the conical surface 43 acting as a flow guiding surface to the inclined openings 20, wherein advantageously a build-up pressure can be decreased relative to a conventional flow guiding surface (perpendicular to the axial direction) and an eddy formation can be reduced.

Now referring to FIGS. 2A-2D and FIG. 3, additional embodiments of the valve part according to the invention of an electromagnetic control valve for a camshaft adjuster are shown. To avoid unnecessary repetition, only the differences from the first embodiment shown in FIG. 1 of the valve part according to the invention will be explained, and reference should be made to the statements above on the first embodiment of FIG. 1.

FIGS. 2A-2D show a perspective view, as well as several sectional views of a control piston according to a second embodiment of the valve part according to the invention for an electromagnetic control valve. Not shown in FIGS. 2A-2D is that the control piston is held in a valve housing shown in FIG. 1 so that it can move in the axial direction.

As can be taken, in particular, from FIG. 2A, the control piston 3 is provided on the tappet side of the fifth groove 15, adjacent to the second cylinder base section 25 of the control piston 3, with two inclined openings 44, which pass through the wall of the cylinder casing section 37 and which are essentially rectangular in a top view. The inclined openings 44 each open into the control piston hollow space 19, whereby the control piston hollow space 19 is connected in a fluid conducting way to the outer side of the control piston 3. The inclined openings 33 are used as a discharge connection T.

In the embodiment of FIGS. 2A-2D, the second cylinder base section 25 of the control piston 3 has a wedge shape, wherein a wedge 46 projects toward the side of the control piston 3 away from the tappet into the control piston hollow space 19. The wedge 46 forms, in the control piston hollow space 19, two wedge surfaces 45, each of which transition into the inclined openings 44, so that the tappet-side wall sections of the inclined openings 44 are part of the wedge surfaces 45. The wall direction 47 of the tappet-side wall sections of the inclined openings 44 or the wedge surfaces 45 are directed at an angle to the axial direction 40, wherein the angle θ is specified with respect to an axial direction 40 directed toward the tappet 5 or toward the second cylinder base section 25 of the control piston 3. The angle θ advantageously lies in an angle range between 20° and 60° and equals ca. 30° in the embodiment shown.

When an axial flow of pressurized medium strikes the wedge surfaces 45, this is deflected by the wedge surfaces 45 acting as flow guiding surfaces toward the inclined openings 44, wherein advantageously a resulting build-up pressure can be decreased relative to a conventional flow guiding surface that is perpendicular to the axial direction and an eddy formation can be reduced.

FIG. 3 shows an axial section view of a valve part corresponding to a third embodiment of the valve part according to the invention for an electromagnetic control valve.

The valve part shown in FIG. 3 differs from the valve part shown in FIG. 1 to the extent that a nozzle directed toward the second cylinder base section 25 is formed in the control piston hollow space 19. For this purpose, on the hollow-space side of the second cylinder casing section 37, surrounding the inner peripheral surface 51 of the second cylinder casing section 37, a nozzle structure 48 narrowing the control piston hollow space 19 is formed. The nozzle structure 48 has, on both sides of a nozzle edge 52 defining the narrowest nozzle diameter, a first nozzle surface 48 and a second nozzle surface 49. The first nozzle surface 48 tapers the control piston hollow space 19 in the direction of the second cylinder base section 25 in a frustum-like shape up to the nozzle edge 52. The second nozzle surface 50 transitions in the axial section in a straight line into the round inclined openings 20, wherein the second nozzle surface 50 and the wall of the inclined openings 20 assume, in the axial section, an equal angle to the axial direction 40. At its narrowest point of the nozzle edge 52, the nozzle structure 48 narrows the diameter of the control piston hollow space 19 from a dimension $D_1$ to a dimension $D_2$ ($D_2 < D_1$).

When an axial flow of pressurized medium enters into the nozzle formed by the nozzle structure 48, the flow rate is increased by the nozzle effect. If the accelerated axial flow of pressurized medium strikes the conical surface 43 of the cone 42, this flow is deflected toward the round inclined openings 20 by the conical surface 43 acting as a flow guiding surface and the nozzle surface 50 acting as a flow guiding surface, wherein advantageously a resulting build-up pressure can be decreased relative to a flow guiding surface that is conventionally perpendicular to the axial direction and, in particular, an eddy formation can be avoided by the increased flow rate.

Although a displacement mechanism is shown in the embodiments, in which the control piston 2 is displaced by a tappet 5 activated by an electromagnet, a different actuator could similarly be provided for activating the tappet 5, such as, for example, an electric servomotor. Furthermore, instead of the flow guiding surface formed by the cone 42 and the wedge 46, other suitably shaped flow guiding surface could be provided.

Although the valve part and the associated control valve were described in the use for controlling the pressurized medium in a camshaft adjuster of an internal combustion engine, the valve part or control valve could be used at the same time for controlling flows of pressurized medium in other devices.

LIST OF REFERENCE SYMBOLS

1 Valve part
2 Valve housing
3 Control piston
4 Valve housing hollow space
5 Tappet
6 End face
7 Compression spring
8 First ring step
9 Second ring step
10 End face
11 First radial boreholes
12 Second radial boreholes
13 Third radial boreholes
14 Fourth ring groove
15 Fifth ring groove
16 Sixth ring groove
17 Fourth radial boreholes
18 Fifth radial boreholes
19 Control piston hollow space
20 Round inclined opening
21 Third ring step
22 Hollow space opening
23 First ring bar
24 Second ring bar
25 Second cylinder base section
26 First control edge
27 Second control edge
28 Third control edge
29 Fourth control edge
30 First outer casing surface
31 First ring groove
32 Second ring groove
33 Third ring groove 34 Cylinder axis
35 First cylinder casing section
36 First cylinder base section
37 Second cylinder casing section
38 Second outer casing surface
39 Inclined opening wall
40 Axial direction
41 Wall direction
42 Cone
43 Conical surface
44 Rectangular inclined opening
45 Wedge surface
46 Wedge
47 Wall direction
48 Nozzle structure
49 First nozzle surface
50 Second nozzle surface
51 Inner peripheral surface
52 Nozzle edge
100 Valve part
101 Valve housing
102 Control piston
103 Valve housing hollow space
104 Tappet
105 End face
106 Compression spring
107 First ring step
108 Second ring step
109 Base surface
110 First radial boreholes
111 Second radial boreholes
112 Third radial boreholes
113 Sixth ring groove
114 Fourth ring groove
115 Fifth ring groove
116 Fourth radial boreholes
117 Fifth radial boreholes
118 Control piston hollow space
119 Sixth radial boreholes
120 Third ring step
121 Hollow space opening
122 First ring bar
123 Second ring bar
124 First ring groove
125 Second ring groove
126 Third ring groove

The invention claimed is:

1. Valve part of a control valve for controlling flows of pressurized medium, the valve part comprising:
    a cylindrical valve housing with a first cylinder casing section, which extends in an axial direction and which comprises a valve housing hollow space, the first cylinder casing section is provided with a first work connection, a second work connection, and a pressure connection, each of which open into the valve housing hollow space,
    a cylindrical control piston held in the valve housing hollow space so that it can move in the axial direction which includes a second cylinder casing section extending in the axial direction and a second cylinder base section extending perpendicular to the axial direction, wherein the second cylinder casing section and the second cylinder base section at least partially define a control piston hollow space,
    the second cylinder casing section, adjacent to the second cylinder base section, is provided with a discharge connection opening into the control piston hollow space, and the control piston is constructed such that the work connections can be connected selectively in a fluid conducting way to the pressure connection and to the discharge connection through axial displacement of the control piston, and
    the discharge connection of the control piston comprises at least one inclined opening, having a wall direction that assumes an angle of less than 90° relative to the axial direction, wherein the inclined opening is angled in an outward direction away from the valve housing in a direction toward the second cylinder base section.

2. Valve part according to claim 1, wherein the wall direction of the at least one inclined openings assumes an angle in an angle range from 20° to 60° relative to the axial direction.

3. Valve part according to claim 1, wherein the at least one inclined opening of the discharge connection of the control piston has a round opening cross section.

4. Valve part according to claim 1, wherein the at least one inclined opening of the discharge connection of the control piston has a rectangular opening cross section.

5. Valve part according to claim 1, wherein the second cylinder base section of the control piston is provided with a flow guiding structure, which projects into the control piston hollow space and which has at least one flow guiding surface that deflects an incoming flow of pressurized medium in a direction toward the at least one inclined opening of the discharge connection.

6. Valve part according to claim 5, wherein the at least one flow guiding surface transitions into the at least one inclined opening of the discharge connection of the control piston.

7. Valve part according to claim 5, wherein the flow guiding structure is constructed in the form of a cone.

8. Valve part according to claim 5, wherein the flow guiding structure is constructed in the form of a wedge.

9. Valve part according to claim 1, wherein the control piston hollow space is shaped at least partially as a nozzle directed toward the second cylinder base section of the control piston.

10. Valve part according to claim 1, wherein the valve housing has a first cylinder base section extending perpendicular to the axial direction, wherein the first cylinder base section and the first cylinder casing section define the valve housing hollow space having an opening on one side.

11. Valve part according to claim 1, wherein the second cylinder casing section and the second cylinder base section define the control piston hallow space having an opening on one side.

12. Valve part according to claim 1, wherein the inclined opening is arranged outside of the valve housing.

13. Valve part of a control valve for controlling flows of pressurized medium, the valve part comprising:
    a cylindrical valve housing with a first cylinder casing section, which extends in an axial direction and which comprises a valve housing hollow space, the first cylinder casing section is provided with a first work connection, a second work connection, and a pressure connection, each of which open into the valve housing hollow space,
    a cylindrical control piston held in the valve housing hollow space so that it can move in the axial direction which includes a second cylinder casing section extending in the axial direction and a second cylinder base section extending perpendicular to the axial direction, wherein the second cylinder casing section and the second cylinder base section at least partially define a control piston hollow space, the second cylinder casing section, adjacent to the second cylinder base section, is provided with a discharge connection opening into the control piston hollow space, and the control piston is constructed such that the work connections can be connected selectively in a fluid conducting way to the pressure connection and to the discharge connection through axial displacement of the control piston, and the discharge connection of the control piston comprises at least one inclined opening, having a wall direction that assumes an angle of less than 90° relative to the axial direction, the second cylinder base section of the control piston is provided with a flow guiding structure, which projects into the control piston hollow space and which has at least one flow guiding surface that deflects an incoming flow of pressurized medium in a direction toward the at least one inclined opening of the discharge connection, the at least one flow guiding surface transitions into the at least one inclined opening of the discharge connection of the control piston, and the at least one flow guiding surface and the at least one inclined opening are directed at the same angle to the axial direction.

14. Valve part of a control valve for controlling flows of pressurized medium, the valve part comprising:

a cylindrical valve housing with a first cylinder casing section, which extends in an axial direction and which comprises a valve housing hollow space, the first cylinder casing section is provided with a first work connection, a second work connection, and a pressure connection, each of which open into the valve housing hollow space, a cylindrical control piston held in the valve housing hollow space so that it can move in the axial direction which includes a second cylinder casing section extending in the axial direction and a second cylinder base section extending perpendicular to the axial direction, wherein the second cylinder casing section and the second cylinder base section at least partially define a control piston hollow space, the second cylinder casing section, adjacent to the second cylinder base section, is provided with a discharge connection opening into the control piston hollow space, and the control piston is constructed such that the work connections can be connected selectively in a fluid conducting way to the pressure connection and to the discharge connection through axial displacement of the control piston, and the discharge connection of the control piston comprises at least one inclined opening, having a wall direction that assumes an angle of less than 90° relative to the axial direction, the control piston hollow space is shaped at least partially as a nozzle directed toward the second cylinder base section of the control piston, and the nozzle has a frustum-like shape tapering toward the second cylinder base section of the control piston.

15. Valve part according to claim 14, wherein a nozzle structure projecting into the control piston hollow space is formed on an inner peripheral surface of the second cylinder casing section of the control piston.

16. Control valve comprising an actuator and a valve part actuated by the actuator, the valve part including:

a cylindrical valve housing with a first cylinder casing section, which extends in an axial direction and which comprises a valve housing hollow space, the first cylinder casing section is provided with a first work connection, a second work connection, and a pressure connection, each of which open into the valve housing hollow space, a cylindrical control piston held in the valve housing hollow space so that it can move in the axial direction which includes a second cylinder casing section extending in the axial direction and a second cylinder base section extending perpendicular to the axial direction, wherein the second cylinder casing section and the second cylinder base section at least partially define a control piston hollow space, the second cylinder casing section, adjacent to the second cylinder base section, is provided with a discharge connection opening into the control piston hollow space, and the control piston is constructed such that the work connections can be connected selectively in a fluid conducting way to the pressure connection and to the discharge connection through axial displacement of the control piston, and the discharge connection of the control piston comprises at least one inclined opening, having a wall direction that assumes an angle of less than 90° relative to the axial direction, wherein the inclined opening is angled in an outward direction away from the valve housing in a direction toward the second cylinder base section.

17. Camshaft adjuster with a control valve according to claim 16.

18. Camshaft adjuster with a control valve according to claim 16, wherein the inclined opening is arranged outside of the valve housing.

* * * * *

UNITED STATES PATENT AND TRADEMARK OFFICE
CERTIFICATE OF CORRECTION

| | | |
|---|---|---|
| PATENT NO. | : 8,118,060 B2 | |
| APPLICATION NO. | : 12/175640 | |
| DATED | : February 21, 2012 | |
| INVENTOR(S) | : John Stallmann | |

It is certified that error appears in the above-identified patent and that said Letters Patent is hereby corrected as shown below:

ON THE TITLE PAGE

At paragraph (73), Assignee: delete "Schaffer Technologies GmbH & Co. KG" and insert therefor -- Schaeffler Technologies GmbH & Co. KG --.

Signed and Sealed this
Twenty-sixth Day of June, 2012

David J. Kappos
*Director of the United States Patent and Trademark Office*